2,938,009

PROCESS OF TREATING SILICA WITH A SILOXANE AND PRODUCT THEREOF

Glennard R. Lucas, Schenectady, N.Y., assignor to General Electric Company, a corporation of New York No Drawing. Filed Apr. 11, 1956, Ser. No. 577,450

6 Claims. (Cl. 260—37)

This invention is concerned with improvements in organopolysiloxanes convertible to the cured, solid, elastic state. More particularly, the invention relates to certain filled organopolysiloxane compositions having reduced structure and lower knit time, said compositions comprising (1) an organopolysiloxane convertible to the cured, solid, elastic state, (2) a finely divided, reinforcing, normally structure-forming, inorganic metallic oxide filler, the particles of which have been coated with a cyclic alkyl polysiloxane corresponding to the general formula $$[R_2SiO]_n$$

where R is a monovalent hydrocarbon radical selected from the class consisting of methyl and ethyl radicals, and $n$ is an integer equal to from 3 to 9, inclusive. Mixtures of said alkyl cyclic polysiloxanes may also be used.

When organopolysiloxanes convertible (for instance, by heat, in the presence of a curing agent or by irradiation with high energy electrons) to the cured, solid, elastic state are mixed with certain reinforcing fillers, especially certain finely divided silicas such as silica aerogel, fume silicas, precipitated silicas, etc. (many examples of such finely divided fillers being described in Warrick Patent U.S. 2,541,137 and French Patents 1,090,566 and 1,025,837), it will be found that on standing even for short periods of time, for instance, even as little as one day, the compounded material becomes tough and nervy. This toughness and nerve of the filled, curable organopolysiloxane, which is also known as "structure," are recognized by the presence of an undesirable snap and difficulty in rendering plastic the rubber compound by usual mechanical working. These undesirable characteristics may occur even while these particular types of fillers are being added on suitable equipment to the aforementioned convertible organopolysiloxane. After incorporation of these structure-inducing fillers in the convertible organopolysiloxane, it will also be found that after the filled compound is stored for any length of time, for instance, from about two days to several months, this toughness and nerve increased to such a point that excessive milling times are required to form a plastic continuous film around the faster roll of a two-roll differential mill (whose rolls are operating at different speeds) normally used for rendering the stored compound plastic prior to further processing of the latter such as for purposes of incorporating other fillers and additives, for instance, curing agents, compression set additives, etc., or for "freshening" the filled compound so as to give better flow in subsequent molding, calendering, or extrusion operations. This inability to obtain a plastic film in a short period of time is due to the fact that the compound on the rolls will not knit readily within a reasonable period of time; in some instances the curable, filled compound will not knit at all even after long periods of milling and it is often impossible to atain a satisfactory plastic (i.e., soft, pressure-flowable) condition with the result that the latter condition requires discarding the filled compound with obvious economic losses. The terms "knit" or "knitting" referred to in the present description are intended to mean the ready fusing of the laps and folds of a vulcanizable silicone rubber stock to form a continuous, homogeneous, textured sheet during milling. A more complete definition of this knitting property is found disclosed in the book, The Vanderbilt 1948 Rubber Handbook, page 79, ninth edition, published in 1948 by the R. T. Vanderbilt Company, 230 Park Avenue, New York, N.Y. The term "knit time" is intended to mean the time required to give this homogeneous, fused sheet.

Unexpectedly, I have discovered that the treatment of these structure-inducing fillers with certain cyclic alkyl polysiloxanes before incorporation in the convertible organopolysiloxanes, materially reduces the structure, while at the same time substantially reducing the knit time within which a plastic, continuous sheet can be attained on the rolls, thus making it much easier to mill the filled organopolysiloxane and to incorporate other additives. The use of these treated fillers with the convertible organopolysiloxane gives the above desirable results even after the mixture of the convertible organopolysiloxane and treated structure-inducing filler (hereinafter this mixture will be designated as "silicone rubber compound") have been stored at normal or slightly elevated temperatures for times as long as 1 to 2 or more months. In accordance with my invention, these desirable features are attained by incorporating in the aforesaid silicone rubber compound the above-described reinforcing filler which has been previously treated with a cyclic dialkyl polysiloxane of the formula $[R_2SiO]_n$ where R and $n$ have the meanings given above. An example of such an alkyl polysiloxane is one having the formula $[(CH_3)_2SiO]_n$ where $n$ has the meaning given above.

It is therefore one of the objects of this invention to reduce the structure of filled, convertible organopolysiloxanes containing a structure-inducing filler.

It is a further object of the invention to reduce the time in which a convertible organopolysiloxane containing a filler which in combination with the former induces structure formation, can be milled in relatively short periods of time to give a plastic, continuous sheet suitable for further processing of additives.

Another object of the invention is to enhance the storage stability of convertible organopolysiloxanes, containing normally structure-inducing fillers, especially certain finely divided silica fillers, so that milling of the silicone rubber compound to freshen the latter for further processing does not require excessive milling times.

A still further object of the invention is to improve the ease of incorporation of silica fillers in very high molecular weight convertible organopolysiloxanes, especially hard, non-flowing gums.

Examples of cyclic alkyl polysiloxanes which may be employed in the treatment of the filler are, e.g., hexamethylcyclotrisiloxane, octamethylcyclotetrasiloxane, decamethylcyclopentasiloxane, dodecamethylcyclohexasiloxane, octadecamethylcyclonasiloxane, hexaethylcyclotrisiloxane, octaethylcyclotetrasiloxane, trimethyltriethylcyclotrisiloxane, tetramethyltetraethylcyclotetrasiloxane, etc., and mixtures thereof. Certain alkenyl alkyl polysiloxanes may also be used, e.g., polymers of the formula $$[(CH_2=CH)(CH_3)SiO]_4$$

In the specification and in the claims, for brevity, the convertible organopolysiloxanes, which may be viscous masses or gummy solids (depending on the state of condensation of the starting organopolysiloxane, polymerizing agent, etc.), will hereinafter be referred to as "convertible organopolysiloxanes" or, more specifically, as "convertible methylpolysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950; all the foregoing patents being assigned to the same assignee as the present invention; Hyde Patent 2,490,357, issued December 5, 1949; and Warrick Patent 2,541,137, issued February 13, 1951.

It will, of course, be understood by those skilled in the art that other convertible organopolysiloxanes containing the same or different silicon-bonded organic substituents (e.g., hydrocarbon radicals, for instance, methyl, ethyl, propyl, vinyl, allyl, phenyl, tolyl, xylyl, benzyl, phenylethyl, naphthyl, etc.; halogenated organic radicals, e.g., chlorophenyl, tetrachlorophenyl, etc.; both methyl and phenyl, etc., radicals) connected to the silicon atoms by carbon-silicon linkages, may be employed in the present invention without departing from the scope of this invention. The particular convertible organopolysiloxane used is not critical and may be any one of those described in the foregoing patents generally obtained by condensation of a liquid organopolysiloxane containing an average of from about 1.98 to 2.05 organic groups per silicon atom. The condensing agents which may be employed are well known in the art and may include, for instance, ferric chloride hexahydrate, phenyl phosphoryl chloride; alkaline condensing agents, such as potassium hydroxide, cesium hydroxide, sodium hydroxide, etc. Each convertible organopolysiloxane generally comprises a polymeric diorganosiloxane which may contain, if desired, for example, up to 2 mol percent copolymerized monoorganosiloxane, for example, copolymerized monomethylsiloxane, as well as small molar concentrations of inter-condensed triorganosiloxy units, e.g., trimethylsiloxy units. Generally, I prefer to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups or methyl and phenyl groups per silicon atom (with or without the concurrent presence of silicon-bonded vinyl groups), and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$ where R is preferably a radical of the group consisting of methyl and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e.g., from 1 to 20 or more mol percent) of any of the following units, alone or in combination therewith: $C_6H_5(CH_3)SiO$ and $(C_6H_5)_2SiO$. The presence of silicon-bonded vinyl groups as well as the presence of halogen, e.g., chlorine, atoms on the phenyl nucleus is not precluded.

The finely divided reinforcing fillers which have caused the above-described structure build-up and undesirable length of time for knitting of the convertible organopolysiloxane are usually finely divided silica fillers which may have free hydroxyl groups either in the form of adsorbed moisture or as silicon-bonded hydroxyl groups, depending on the method by which they are prepared. Under some conditions of manufacture, these structure-inducing fillers which originally contained hydroxyl groups, for instance, hydroxyl groups bonded directly to silicon of the silica molecule no longer contain hydroxyl groups due to modification of such silicas, for instance, by the introduction of silicon-bonded alkoxy groups in place of some of the silicon-bonded hydroxyl groups. Such silicas cause increased structure and knit times when these silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such structure-causing silica fillers may be found described in U.S. Patents 2,541,137; 2,610,167 and 2,657,149, as well as French Patents 1,025,837 (issued 1953) and 1,090,566 (issued 1955). Such structure-causing fillers may be slightly acidic or alkaline (i.e., have pH's slightly below or above 7) depending upon the method of manufacture, and may be obtained through an aerosol-aerogel process, by fuming processes such as by the vapor phase burning of silicon tetrachloride or ethyl silicate, by precipitation means, etc.

Another finely divided reinforcing filler which has been employed with convertible organopolysiloxanes but which also imparts undesirable structure to the convertible organopolysiloxane is a finely divided gamma alumina of average particle size less than 100 millimicrons. Such a filler and its use in combination with convertible organopolysiloxanes are more particularly described and claimed in the patent of Richard M. Savage, 2,671,069, issued March 2, 1954, and assigned to the same assignee as the present invention.

The amount of the treated structure-inducing filler used in combination with the convertible organopolysiloxane may obviously be varied within wide limits, for instance, from about 10 to 200 percent, by weight, of the filler based on the weight of the convertible organopolysiloxane. The exact amount of filler used will depend upon such factors as, for instance, the application for which the convertible organopolysiloxane is intended, the type of filler employed (e.g., density of the filler), the type of convertible organopolysiloxane employed, etc. The structure difficulty and excessive knit times are particularly troublesome when the above-described fillers comprise, by weight, from 0.2 to 0.8 part filler per part convertible organopolysiloxane. One of the added advantages of treating the fillers with the liquid cyclic alkyl polysiloxanes is that larger amounts of filler can be incorporated in the convertible organopolysiloxanes than is usually possible without undesirable effects on the properties of the cured products. Obviously, mixtures of these reinforcing fillers, either alone or in combination with non-reinforcing fillers wherein the reinforcing filler comprises a sufficient amount, usually a majority of the weight of the fillers, to cause the undesirable structure build-up and increased knit time, may also be employed. Examples of other fillers (these may also be treated as described above) which may be incorporated in combination with the treated structure-inducing fillers may be, for instance, titanium dioxide, lithopone, zinc oxide, zirconium silicate, iron oxide, diatomaceous earth, finely divided sand, calcium carbonate, etc. If desired, these fillers may be treated with liquid organopolysiloxanes to improve the ease of dispersibility in the convertible organopolysiloxane.

Various curing agents to effect more rapid conversion of the convertible organopolysiloxane to the cured, solid, elastic state may be incorporated. Among such curing agents may be mentioned, for instance, benzoyl peroxide, tertiary butyl perbenzoate, bis(2,4-dichlorobenzoyl)peroxide, etc. These curing agents (or "vulcanization accelerators" as they are often designated) may be present in amounts ranging from about 0.1 to as high as 4 to 8 percent or more, by weight, based on the weight of the convertible organopolysiloxane. High energy electron irradiation without curing agents may also be employed for vulcanization purposes.

The manner in which the present invention may be practiced for making the treated fillers requires the exercise of certain precautions and certain techniques which are believed to be necessary in order to give the optimum results. In carrying out the treating process, it is desirable that the cyclic alkyl polysiloxane employed be sufficiently volatile so that at reasonable temperatures, for instance, at 150° C. to 350° C. either at normal pressures or when using reduced pressures or vacuum, ready volatilization of the cyclic polysiloxane takes place so as to diffuse the polysiloxane through the silica particles. Advantageously, all the alkyl polysiloxane not adsorbed on the filler particles may be removed by this heating step. In general, I have found that one of the best methods for obtaining the treated fillers is to mix the filler intimately with the cyclic alkyl polysiloxane (or mixture of cyclic alkyl polysiloxanes) which is advantageously in the form of a liquid, in amounts ranging from about 5 to 50%, by weight, of the cyclic polysiloxane based on the weight of the filler being treated. After effecting intimate dispersion of the filler in the volatile cyclic polysiloxane liquid, the mixture is then heated at temperatures up to those recited above to permit homogeneous spreading of the polysiloxane fluid throughout the filler mass. This heating, especially at reduced pressures, may also be used to remove excess polysiloxane.

As a further advantage of using this treatment, it has been found that these finely divided reinforcing fillers have small amounts of adsorbed moisture which affect adversely the properties of the mixture of the convertible organopolysiloxanes and these types of fillers, particularly the storage stability of these mixture. By means of this treatment with the volatile cyclic alkyl polysiloxane, the latter acts as an azeotropic drying agent so as to remove the traces of moisture and to displace the moisture with a very thin film of the cyclic alkyl polysiloxane firmly adsorbed on the filler particles. This removal of the moisture improves the electrical properties of the cured products.

Generally, the heating is advantageously carried out at a temperature (atmospheric pressure) above the boiling point of the cyclic alkyl polysiloxane (or mixture of cyclic alkyl polysiloxanes) used. For instance, with the octamethylcyclotetrasiloxane, it is usually only necessary to heat the mixture of the filler and the octamethylcyclotetrasiloxane at a temperature of about 150° to 300° C. for about one to four hours employing any desired reduced pressures. Because the boiling point of octamethylcyclotetrasiloxane is around 177° C., it is apparent that the latter will volatilize quite rapidly leaving behind the treated filler. Obviously, the temperature and times may be varied widely depending upon such conditions as the amount and type of cyclic alkyl polysiloxane used, the type of filler being treated, the interdependence of time and temperature when integrated with the use of reduced pressures (which may be as low as 0.5 mm.), etc.

Obviously other methods for treating the reinforcing silica may be employed without departing from the scope of the invention. For example, one method comprises continuously introducing in a heated atmosphere finely divided structure-inducing silica filler and the volatile cyclic polysiloxane into an air-jet mill of the type described in the July 1955 issue of Chemical Processing in an article entitled "Efficient Particle-Size Reduction." Such equipment is sold by the Fluid Energy Processing and Equipment Company, Philadelphia, Pennsylvania.

After treatment with the cyclic alkyl polysiloxane described above, it will be found that the filler so produced is hydrophobic and remains so even after long heating at elevated temperatures. Thus, in the case of treatment of the filler with octamethylcyclotetrasiloxane, the treated filler can be heated for long periods of time at 250° C., well above the boiling point of the octamethylcyclotetrasiloxane, without any apparent change in the hydrophobicity of the filler.

What is particularly desirable in the treatment of the fillers herein described is the fact that the bulk density of the treated filler is essentially unchanged from the bulk density of the initial untreated filler. This is in direct contrast with the results that are usually obtained by treating the filler with some of the organo-silicon compositions described in the prior art. Thus, when one employs, for instance, trimethylchlorosilane which is a material often disclosed for the purpose of treating fillers, one finds that, in addition to having to cope with the evolution of hydrogen chloride released in the treatment, also the bulk density of the product is materially reduced and in some instances is less than half of the bulk of the original untreated finely divided filler.

One of the additional unexpected results found as a result of the treatment of the filler was the fact that after treatment the weight of the filler was not materially changed from the original weight of the filler prior to treatment. In other words, it appears that the amount of cyclic alkyl polysiloxane retained on the filler is extremely small although obviously present because of the introduction of hydrophobicity into the filler. This may be due to the possibility that the moisture on the filler has been replaced by a thin film of the cyclic alkyl polysiloxane.

After treatment of the filler, the treated filler is then incorporated in the convertible organopolysiloxane and the mixture thus stored for long periods of time. When it is desired to use the same, it can be readily milled and in a relatively short period of time one will find that it will readily sheet and form a continuous (that is, unbroken) film on the rolls, thereby permitting the incorporation of curing agents, dyes, pigments, compression set additives, etc., when desired for use with the convertible organopolysiloxanes. If one employs initially untreated filler with the convertible organopolysiloxane, it will be found that after storage of the silicone rubber compound containing the structure-inducing filler, long periods of time will be required even before the silicone rubber compound will start to form a sheet, and longer times will expire before the compound will adhere to the rolls; usually a non-continuous lace-like effect will be encountered for a long time before an unbroken adhering sheet is attained.

The silicone rubber compound containing the treated filler can be molded, for instance, at temperatures of the order of about 100 to 200° C. for varying lengths of time, for instance, from about 5 to 30 minutes or more. In this instance, molding pressures ranging from about 10 to 1000 p.s.i. or more are advantageously used. The molded product is preferably given a further heat-treatment at elevated temperatures, for example, for about 1 to 36 hours or more at temperatures ranging from about 150° to 250° C. to bring out the optimum properties of the cured organopolysiloxane.

Where desired, solvent and dispersing media such as toluene, xylene, butanol, etc. may be employed to make solutions and dispersions for coating and impregnating purposes. These coating compositions may be used to treat (e.g., coat and impregnate) various sheet materials such as glass cloth, asbestos cloth, mica sheets, various fibers, and finely divided fillers, such as mica, glass fibers, asbestos floats, etc. Such treated products may be heated at the requisite temperature to remove solvent or dispersing media (if coating compositions are involved), and thereafter further heat-treated at the elevated temperatures recited previously to convert the organopolysiloxane to the cured, solid, elastic state.

In order that those skilled in the art may better understand how the present invention may be practiced, the following examples are given by way of illustration and not by way of limitation. All parts are by weight.

In the following examples, unless otherwise stated, the convertible methylpolysiloxane used was obtained by hydrolyzing dimethyldichlorosilane, isolating substantially pure octamethylcyclotetrasiloxane, and condensing the latter with a small amount, for instance, about 0.01 percent, by weight, thereof of potassium hydroxide until a benzene-soluble, highly viscous mass bordering on a gummy solid was obtained. This benzene-soluble methylpolysiloxane had a ratio of approximately two methyl groups per silicon atom.

The knit time test employed in the following examples was conducted as follows: A two-roll differential laboratory mill, 3" x 8", was employed in which the speed ratio was 1.4 to 1 and the faster roll revolved at a speed of about 60 revolutions per minute. The mill roll clearance was adjusted to pass a 12 mil thick soft solder slug at a temperature of around 70° to 90° F. In conducting the test for knit time, 30 grams of the compound under test were added to the nip of the roll in small pieces to permit passage therethrough. A preliminary pass often was required at a somewhat slightly wider setting to reduce the sample thickness. When all of the compound had passed through the nip once, a stop watch was triggered and the timing begun. The compound was added to the nip again and in order to keep the "bank" of compound in motion, it was sometimes necessary to open the mill slightly for a brief interval and then return to the predetermined 12-mil adjustment. The timing was continued until the compound became plastic and completely covered the width of the faster roll in the form of a continuous solid film. As soon as this happened, the timing was stopped and this elapsed time was recorded as "knit time."

EXAMPLE 1

In this example various types of finely divided silica fillers of a reinforcing nature were treated with octamethylcyclotetrasiloxane in the following manner. Each of the fillers in a certain weight basis was mixed with varying amounts of octamethylcyclotetrasiloxane until an intimate mixture had been obtained. Thereafter, the mixture was heated at 250° C. for varying lengths of time depending on the mixture of ingredients and the weight loss determined in each instance. The following Table I shows the particular fillers used, the weights of the filler and octamethylcyclotetrasiloxane, the heating time at 250° C. and the weight loss as the result of this heating cycle. The fume silica used is obtained by the burning of silicon tetrachloride in the vapor phase to give a finely divided silica; this material is manufactured by DeGussa Company and sold as "Aerosil"; another such filler is sold by the Godfrey L. Cabot Company, Boston, Massachusetts, as "Cab-O-Sil." The silica aerogel used is manufactured by the Monsanto Chemical Company and again is a finely divided reinforcing silica. The precipitated silica used is manufactured and sold by the Columbia Chemical Division of the Pittsburgh Plate Glass Company, and again is a reinforcing finely divided silica filler of average particle size of about 0.025 micron.

Table I

| Filler Number | Filler | Weight Filler, Grams | Weight Methyl- polysiloxane Fluid, Grams | Heating Time at 250° C. | Weight Loss, Grams |
|---|---|---|---|---|---|
| 1 | Fume silica | 53.4 | 0 | 72 | 0 |
| 2 | ---do--- | 47.7 | 9.5 | 72 | 6.5 |
| 3 | Silica aerogel | 230 | 46 | 20 | 42 |
| 4 | Precipitated silica | 220 | 44 | 18 | 44 |
| 5 | Silica aerogel | 174 | 34 | 40 | 30 |
| 6 | ---do--- | 189 | 38 | 40 | 37 |
| 7 | ---do--- | 288 | 58 | 24 | 51.0 |
| 8 | ---do--- | 288 | 58 | 48 | 51.5 |
| 9 | ---do--- | 192 | 38 | 24 | 35 |
| 10 | ---do--- | 192 | 38 | 48 | 35 |
| 11 | Precipitated silica | 212 | 84 | 24 | 84 |

All the treated fillers described in Table I above were hydrophobic when tested in water. This test comprised mixing the filler with water and determining the floating characteristics. In every instance the treated filler, even after long periods of exposure to water, continued to float on the surface and evidenced no wetting. In contrast to this, untreated or dried filler, that is, the filler which had been heated at elevated temperatures of 250° C. for long periods of time, did not float and when immersed in water rapidly became wet and sank to the bottom of the vessel in which the test was taking place. Proof that the octamethylcyclotetrasiloxane was not acting merely as a drying agent was evidenced by the fact that when the same fillers were treated with xylene which is a well-known azeotropic agent for removing water, and the treated fillers thereafter immersed in water, they wet instantly and showed no hydrophobic characteristics.

EXAMPLE 2

Formulations were prepared from 100 parts of the convertible methylpolysiloxane described above, 43.3 parts of the treated silica aerogel filler No. 3 of Example 1 and one part benzoyl peroxide. A similar formulation was prepared with the exception that untreated silica aerogel was employed in place of the treated silica aerogel. Each of the compounds was aged for one day and for fourteen days at room temperature, and thereafter tested for knitting characteristics in accordance with the procedure described previously. It was found that the compound containing the treated silica aerogel filler, after one day storage, formed a band at once and gave a smooth sheet in around 30 seconds. The knit time after two weeks was about 50 seconds. In contrast to this, the sample in which the silica aerogel was untreated, after 24 hours banded much differently than did the sample containing the treated filler, requiring 240 seconds to knit. After two weeks the knit time was 390 seconds. Samples molded from each of the two compounds gave essentially the same tensile strength and elongation after the final curing cycle.

EXAMPLE 3

In this example, various formulations were made from the convertible methylpolysiloxane and treated filler No. 7 shown in Example 1. The mixture of ingredients was composed of 100 parts of the convertible methylpolysiloxane, 1 part benzoyl peroxide and varying amounts of Filler No. 3. One sample identified as sample A contained 60 parts of the treated filler and another sample contained 80 parts of the treated filler (identified as sample B). Each of the compounds was tested for knit time in accordance with the procedures described above. As a result of this test, it is found that samples A and B freshened readily after 6 days storage and showed a knit time of about 30 seconds.

EXAMPLE 4

In this example, a molding compound was prepared from 100 parts of the convertible methylpolysiloxane, 45 parts of treated silica aerogel (Filler No. 5) and 1.5 parts benzoyl peroxide. A similar formulation was prepared with the exception that untreated silica aerogel was used in place of the treated filler. Each of the compounds was allowed to stand at room temperatures for six days and thereafter the knit time was determined. The knit time of the sample containing the treated silica aerogel was about 120 seconds while the sample which contained the untreated filler was almost impossible to freshen and fell off the mill for 10 minutes; eventually it had a knit time of 24 minutes. Each of the molding compounds was molded for about 15 minutes at 135 to 140° C. in the form of sheets at a pressure of about 500 p.s.i. and the tensile strengths and elongations of the molded samples determined, in one instance, after heat aging the samples for one hour at 150° C. and in another instance, after heat-aging the samples for 24 hours at 250° C. After the one hour at 150° C. heat-aging, the sample containing the treated filler had a tensile strength of 1520 p.s.i. and elongation of 460% while the sample containing the untreated filler had a tensile strength of 1210 p.s.i. and an elongation of 350%. After the 24 hour heating at 250° C., the sample containing the treated silica aerogel had a tensile strength of 955 and a percent elongation of 285%, while the sample containing the untreated filler had a tensile strength of 880 and a percent elongation of 400%.

EXAMPLE 5

In this example molding compounds were prepared from formulations composed of 100 parts of the above-described convertible methylpolysiloxane, 50 parts of treated finely divided silica and 0.8 part benzoyl peroxide. Three samples were prepared varying the type of treated filler. Sample C contained treated Filler No. 7, sample D contained treated Filler No. 9 and sample E contained treated precipitated silica, namely, Filler No. 11. The knit time of each of the samples was tested after standing for six days, and thereafter molded samples were prepared employing the same molding condition as described in Example 4 above, after which the samples were aged, in one instance, for one hour at 150° C., and in another instance for 41 hours at 250° C. All three samples showed a knit time of about 10 to 15 seconds after the six-day storage test. The physical tests on the samples are described in Table II.

*Table II*

|  | Sample C | | Sample D | | Sample E | |
| --- | --- | --- | --- | --- | --- | --- |
|  | 1 hr./ 150° C. | 41 hrs./ 250° C. | 1 hr./ 150° C. | 24 hrs./ 250° C. | 1 hr./ 150° C. | 24 hrs./ 250° C. |
| Tensile, p.s.i. | 1,595 | 810 | 1,495 | 855 | 1,275 | 615 |
| Percent elongation | 745 | 355 | 705 | 415 | 630 | 255 |
| Tear strength, pounds | 215 | 95 | 205 | 90 | 155 | 75 |

EXAMPLE 6

This example illustrates the use of another finely divided silica filler which induces structure in organopolysiloxane elastomers convertible to the cured, solid, elastic state. More particularly, the filler used in this example comprised a silica aerogel of the type described in the previous examples but differs from previous silica aerogels in that impurities, particularly salts such as sodium sulfate, usually found in the silica aerogel as a result of the process of making the same, have been removed. This latter treatment to remove the impurities improves the electrical characteristics of the silica aerogel, particularly when incorporated as a filler in the silicone rubber. This purified silica aerogel is also manufactured by Monsanto Chemical Company and is sold as Santocel FR. The treatment of the purified silica aerogel was accomplished by mixing 250 parts of purified silica aerogel and 75 parts octamethylcyclotetrasiloxane, effecting intimate dispersion of the octamethylcyclotetrasiloxane in the particles of silica aerogel by tumbling the mixture for several hours, and thereafter heating the treated filler in an open container for about 5 hours at 250° C. and allowing the volatile materials to escape. Thereafter, 100 parts of a convertible methylpolysiloxane similar to that employed in the preceding examples, but in this instance the methylpolysiloxane contained about 0.2 mol percent silicon-bonded vinyl radicals, was mixed with 48 parts of the above-described treated, purified silica aerogel and 1 part benzoyl peroxide. A similar formulation was prepared employing the untreated silica aerogel but using the same proportions of ingredients. Each of the molding compositions was tested for knit time after 3 days aging and 7 days aging. In addition, each composition was molded similarly as described in the previous examples and thereafter heat-aged for 24 hours at 250° C. As a result of this testing, it was found that the knit time for the composition containing the treated purified silica aerogel filler was 10 seconds after 3 days aging and 15 seconds after 7 days aging. In contrast to this, the sample containing the untreated filler showed a knit time of 85 seconds after 3 days aging and 113 seconds after 7 days aging. The physical properties of the molded samples were essentially the same. Thus, the physical properties of the molded sample containing the treated filler had a tensile of 825 p.s.i., elongation of 190 percent, and a tear strength of about 106 lbs. per inch. The physical properties of the molded sample containing the untreated filler had a tensile of 788 p.s.i., an elongation of 180 percent, and a tear strength of 112 lbs. per inch.

As can be seen from the above examples, the use of treated fillers in accordance with the present invention imparts to the moldable silicone rubber compound a reduced tendency to develop structure and a marked increase in the ability of the compound to freshen rapidly even after long periods of storage. In addition, it has been found that in some instances improved tensile strengths and elongation are obtained by using the treated filler. There is also clear evidence, as shown in the preceding examples, that less catalyst, for instance, benzoyl peroxide, bis(2,4-dichlorobenzoyl) peroxide, etc., is required to obtain optimum properties in combination with the treated fillers than is necessary when using untreated fillers.

Fillers treated in accordance with the above-described process employing the cyclic alkyl polysiloxanes as the treating medium, have advantages over the same fillers treated with, for instance, trimethylchlorosilane or with linear alkyl polysiloxanes. Thus, when reinforcing silica fillers are treated with trimethylchlorosilane, there is a marked decrease in the surface area of the silica particles as compared with no change in surface area of the same filler treated with a cyclic alkyl polysiloxane. This reduction in surface area increases the difficulty of incorporating such treated fillers in convertible organopolysiloxane as compared to the ease with which a filler treated with the cyclic alkyl polysiloxane is incorporated. In addition, this reduction in surface area causes the trimethylchlorosilane-treated fillers to yield tacky molding compound which in turn results in undesirable reduction in the durometer of the molded products prepared therefrom.

In contrast to this, silicone elastomers containing fillers treated with cyclic alkyl polysiloxanes do not exhibit any of this tack or stickiness and show normal durometers for all cured samples within the range of durometers of the same molded samples prepared from compound using untreated filler. Furthermore, on a direct comparison basis, products molded from compositions containing filler treated with the cyclic alkyl polysiloxanes, for the same durometer, show from 10 to 30 percent better elongation than similar formulations employing reinforcing silica fillers treated with trimethylchlorosilane.

The use of linear alkyl polysiloxanes for treating silica reinforcing fillers does not give results equivalent to those one obtains using fillers treated in accordance with the practice of the presently claimed invention. Thus, most of the linear alkyl polysiloxanes have such high boiling points and low vapor pressures, that it is difficult to remove them sufficiently from the mixture of the latter and the filler. To effect satisfactory removal requires extremely high temperatures with possible undesirable effects on the treated filler as well as the extra cost for such removal. Although low molecular weight linear organopolysiloxanes such as hexamethyldisiloxane or decamethyltetrasiloxane have lower boiling points and lower vapor pressures, nevertheless, it has been found that silicone rubber molded products prepared from molding compositions containing reinforced silica fillers treated with such low molecular weight linear alkyl polysiloxanes have inferior compression set as compared to the compression set of molded products obtained using reinforcing silica fillers treated with the cyclic alkyl polysiloxanes.

It will, of course, be apparent to those skilled in the art that amelioration of the undesirable effects of other structure-inducing fillers, as well as fillers which cause undesirably long knit times, is intended to be included within the scope of the present invention. Moreover, other convertible organopolysiloxanes, for instance, convertible ethylpolysiloxanes, as well as other cyclic alkyl polysiloxanes, may be employed in place of the convertible methylpolysiloxanes and cyclic polysiloxanes described in the foregoing examples. The proportions of ingredients may be varied widely as may the other conditions recited above without departing from the scope of the invention. The application involved, the organopolysiloxane used, the filler employed, the cyclic alkyl polysiloxanes used, etc., will all contribute to the relationship between the ingredients as far as proportions and selection thereof are concerned. Obviously, other fillers which do not induce structure or which do not undesirably affect knit time such as, for instance, titanium dioxide, ferric oxide, calcium carbonate, etc., may be incorporated in combination with the structure-inducing fillers.

The compositions herein described having reduced structure and lower knit times can be advantageously employed in extrusion, molding, and calendering applications. Alternatively, these compositions can be dissolved and/or dispersed in suitable solvents or dispersing agents and used for coating and impregnating purposes for coating glass tape, glass fibers, glass fiber sheets, asbestos cloth, etc. In the latter instance, glass cloth can be coated with the convertible organopolysiloxanes herein described containing the treated filler and curing agent, and thereafter the coated glass cloth can be wrapped around mandrels to make heater ducts and cured under heat and pressure to give unitary structures having outstanding heat resistance. The significance of the reduction of structure lies in the ability to readily compound on rolls a filled silicone compound within commercially feasible times by mechanical action on suitable equipment after the compound has been stored for long periods of time, and thereafter to use it in any of the above-identified applications by normal fabricating techniques. Compounds prepared in the above manner can be readily extruded over electrical conductors and can be heat-treated at elevated temperatures in order to obtain a smooth, coherent, cured insulation having outstanding thermal stability. By virtue of the displacement of moisture on the fillers, and the substitution of a fine film of alkylpolysiloxanes, one is able to obtain improved electrical properties in the cured products.

What I claim as new and desire to secure by Letters Patent of the United States is:

1. The process for reducing the structure and knit time of an organopolysiloxane convertible to the cured, solid, elastic state and containing an average of from 1.98 to 2.05 organic groups per silicon atom, in which the structure is caused by the presence of a finely divided structure-inducing filler selected from the class consisting of silica aerogel, fume silica, and precipitated silica, which process comprises treating the filler with octamethylcyclotetrasiloxane at a temperature of from 150° C. to 350° C. to effect diffusion of the octamethylcyclotetrasiloxane through the filler and to remove at least some of the octamethylcyclotetrasiloxane, leaving behind finely divided filler particles containing an adsorbed film of the octamethylcyclotetrasiloxane, and thereafter incorporating the treated filler in the said organopolysiloxane.

2. The process of reducing the structure and knit time of a methylpolysiloxane having an average of from about 1.98 to 2.05 methyl groups per silicon atom, in which the structure is caused by the presence of a finely divided structure-inducing filler selected from the class consisting of silica aerogel, fume silica, and precipitated silica, which process comprises treating the filler with octamethylcyclotetrasiloxane at a temperature of from 150° C. to 350° C. to effect diffusion of the octamethylcyclotetrasiloxane through the filler and to remove at least some of the octamethylcyclotetrasiloxane, leaving behind finely divided filler particles containing an adsorbed film of octamethylcyclotetrasiloxane, and thereafter incorporating the treated filler in the said methylpolysiloxane.

3. The process for reducing the tendency of a finely divided filler selected from the class consisting of silica aerogel, fume silica, and precipitated silica to induce structure when incorporated in an organopolysiloxane elastomer convertible to the cured, solid, elastic state, which process comprises treating the particles of the finely divided silica filler with octamethylcyclotetrasiloxane at a temperature of from 150° C. to 350° C. to effect diffusion of the octamethylcyclotetrasiloxane through the finely divided silica filler particles and to remove at least some of the octamethylcyclotetrasiloxane, leaving behind finely divided silica particles containing an adsorbed film of the octamethylcyclotetrasiloxane.

4. The process of claim 3 in which the finely divided silica filler is a silica aerogel.

5. The process of claim 3 in which the finely divided silica filler is a fume silica.

6. An organopolysiloxane of reduced structure and knit time prepared by the process of claim 1.

References Cited in the file of this patent

UNITED STATES PATENTS

| 2,563,555 | Safford | Aug. 7, 1951 |
| 2,567,315 | Bidaud | Sept. 11, 1951 |
| 2,610,167 | Te Grotenhuis | Sept. 9, 1952 |
| 2,705,206 | Wagner | Mar. 29, 1955 |
| 2,705,222 | Wagner | Mar. 29, 1955 |
| 2,785,147 | Kantor | Mar. 12, 1957 |
| 2,843,555 | Berridge | July 15, 1958 |
| 2,859,198 | Sears et al. | Nov. 4, 1958 |
| 2,891,923 | Phreaner | June 23, 1959 |